United States Patent [19]

Mowdood et al.

[11] Patent Number: 4,895,911

[45] Date of Patent: Jan. 23, 1990

[54] TALL OIL FATTY ACID MIXTURE IN RUBBER

[75] Inventors: Syed K. Mowdood, Akron; Bharat K. Kansupada, Mogadore, both of Ohio

[73] Assignee: The Goodyear Tire & Rubber Company, Akron, Ohio

[21] Appl. No.: 395,697

[22] Filed: Aug. 18, 1989

Related U.S. Application Data

[62] Division of Ser. No. 254,055, Oct. 6, 1988, Pat. No. 4,870,135.

[51] Int. Cl.$^4$ ............................................. C08C 19/20
[52] U.S. Cl. .................................... 525/346; 524/274; 524/312; 524/313; 525/194
[58] Field of Search ................ 525/346, 194; 524/274, 524/312, 313

[56] References Cited

U.S. PATENT DOCUMENTS 3,325,429  6/1967  Harris ................................... 524/394
4,154,911  5/1979  Bak et al. ............................. 428/462
4,244,413  1/1981  Takahashi et al. ................... 152/323

FOREIGN PATENT DOCUMENTS 551718  1/1958  Canada .

Primary Examiner—Christopher Henderson
Attorney, Agent, or Firm—Bruce J. Hendricks

[57] ABSTRACT

There is disclosed a method for enhancing the cure of a sulfur vulcanizable elastomer which comprises adding to the vulcanizable elastomer a mixture of tall oil fatty acids comprising at least (a) from about 28% to about 55% by weight of oleic acid, (b) from about 25% to about 40% by weight of linoleic acid, (c) from about 4% to about 20% conjugated linoleic acid and (d) from about 0% to about 8% rosin acids. Use of a mixture of tall oil acids as a cure activator significantly lowers the cost of producing the vulcanizate while concomitantly improving the adhesion and dynamic properties of the elastomer.

7 Claims, No Drawings

TALL OIL FATTY ACID MIXTURE IN RUBBER

This is a Divisional of Application Ser. No. 07/254,055, filed on October 6, 1988, now U.S. Pat. No. 4,870,135.

TECHNICAL FIELD

This invention is concerned with enhancing cure of a sulfur vulcanizable elastomer with concomitant improvement in the adhesion and dynamic properties of the elastomer.

BACKGROUND ART

Vulcanization, or curing, is a process where elastomers, natural and/or synthetic, are mixed with various materials which will cause the elastomer to undergo crosslinking upon application of heat. These materials are conventionally compounded with the elastomer to help improve the elastomer's cured physical properties, e.g., tensile strength and temperature sensitivity. Vulcanization and the resulting improved properties may be obtained by reacting the raw elastomer with sulfur in the presence of other cure activators. Fatty acids, i.e., oleic and stearic, have been commonly used as activators in sulfur vulcanization of diene rubbers in the presence of zinc oxide and an accelerator. During the early stages of vulcanization, the zinc carboxylate (the reaction product of zinc oxide and fatty acid) reacts with the accelerator to form a complex. A nucleophilic attack by the complex on the ring of orthorhombic sulfur results in the formation of a zinc perthiomercaptide complex. This zinc perthiomercaptide complex is believed to be the sulfurating agent responsible for the crosslinking of the elastomer's chains. The role of the fatty acid, i.e., oleic or stearic, is believed to increase the solubility of zinc oxide and subsequent reactivity of the zinc perthiomercaptide complex. Stearic acid is commonly used for vulcanization, however, the stearic acid suffers from the disadvantage of a high bloom rate, consequently causing some loss of adhesion properties. A disadvantage of oleic and stearic acid is that they are significant contributors to the rising cost of production of elastomers. Therefore, there exists a need for a cheaper and abundant material which can be used as a substitute for oleic or stearic acid with concomitant improvement in adhesion properties of the rubber.

SUMMARY OF THE INVENTION

The present invention relates to a method of enhancing cure of a sulfur vulcanizable elastomer by adding to the elastomer a mixture of tall oil fatty acids.

DETAILED DISCLOSURE OF THE INVENTION

There is disclosed a method of enhancing cure of a sulfur vulcanizable elastomer which comprises adding to the elastomer a mixture of tall oil fatty acids wherein the mixture of tall oil fatty acids comprise at least (a) from about 28% to about 55% by weight of oleic acid, (b) from about 25% to about 40% by weight of linoleic acid, (c) from about 4% to about 20% conjugated linoleic acid and (d) from about 0% to about 8% rosin acids.

There is also disclosed a sulfur vulcanizable composition comprising a sulfur vulcanizable rubber, a vulcanizing agent and a cure activator wherein the cure activator is a mixture of tall oil fatty acids comprising (a) from about 28% to about 55% by weight of oleic acid, (b) from about 25% to about 40% by weight of linoleic acid, (c) from about 4% to about 20% conjugated linoleic acid, and (d) from about 0% to about 8% rosin acids.

Tall oil fatty acids (TOFA) are obtained by the distillation of crude tall oil. Crude tall oil, a by-product of the Kraft pulping process, is a mixture of fatty acids, rosin acids and unsaponifiables. These components are separated from one another by a series of distillations. The fatty acids are predominantly 18-carbon straight-chain mono- or diunsaturated fatty acids. Specifically, the fatty acids may include oleic acid, 9,12-linoleic acid, 9,11-linoleic acid (conjugated linoleic acid), stearic acid, pinolenic acid, eicosenoic acid, palmitic acid, palmitoleic acid, magaric acid, octadecadienoic acid, octadecatrienoic acid and the like. Generally speaking, the mixture of tall oil acids for use in the present invention should contain from about 28% to about 55% of oleic acid, from about 25% to about 40% by weight of linoleic acid, and from about 4% to about 20% of the conjugated linoleic acid. The remaining fatty acid components may comprise from about 1 to 15% by weight of any of the remaining above mentioned fatty acids, for example, from about 1% to about 4% of stearic acid. In addition to the fatty acids, the tall oil fatty acid mixture for use in the present invention may contain minor amounts of rosin acids. For use in the present invention, the rosin acid component should not exceed 8% by weight of the total weight of mixture of tall oil fatty acids. Rosin acids that are generally found in tall oil fatty acid mixtures may include abietic acid, dihydroabietic acid, palustric/levopimaric acid, 9,10-secodehydroabietic acid, pimaric acids, tetrahydroabietic acid, isopimaric acid, neoabietic acid, and the like. Preferably, the range of component acids in the tall oil fatty acid mixture will comprise from about 41% to about 47% by weight of oleic acid, from about 30% to about 40% by 9,12 linoleic acid, from about 10% to about 19% 9,11 (conjugated) linoleic acid, and from about 0 to about 6% rosin acids. The respective weight percentages of the fatty acids may be determined according to ASTM D-803-65. The respective weight percentages of the rosin acids may be determined by ASTM D-1240-54.

TOFA mixtures are commercially available from a number of refiners such as Arizona Chemical Company of Panama City, Florida, Georgia Pacific, Hercules, Monsanto-Emery, Reichhold, Sylvachem, Union Camp and Westvaco of North Charleston, South Carolina.

The method of the present invention may be used with varying amounts of the tall oil fatty acid mixture. Generally, the amount of the tall oil fatty acid mixture that may be added to the vulcanizable material generally comprises from about 0.1 to about 6.0 phr (parts per hundred rubber). Preferably, the amount of tall oil fatty acid mixture that is added generally comprises from about 0.5 to about 2.5 phr.

A significant advantage of the present invention is that it reduces the cost of production of rubber compounds by substituting lower cost fatty acids for more refined oleic or stearic acid as vulcanization activators with concomitant improvement in the adhesion, physical and dynamic properties of the vulcanizate. These properties include torque, minimum torque and modulus.

The term "rubber" or "elastomer" as used herein embraces both natural rubber and all its various raw and reclaimed forms as well as various synthetic unsaturated or partially unsaturated rubbers, i.e., rubber polymers of the type which may be vulcanized with sulfur. Representative of synthetic polymers are the homopolymerization products of butadiene and its homologues and derivatives, as for example, methylbutadiene, dimethylbutadiene and pentadiene as well as copolymers such as those formed from a butadiene or its homologues or derivatives with other unsaturated organic compounds. Among the latter are olefins, for example, ethylene, propylene or isobutylene, which copolymerizes with isoprene to form polyisobutylene also known as butyl rubber; vinyl compounds, for example, vinylchloride, acrylic acid, acrylonitrile (which polymerizes with butadiene to form Buna-N rubber), methacrylonitrile, methacrylic acid, methyl styrene and styrene, the latter compound polymerizing with butadiene to form Buna-S rubber, as well as vinyl esters and various unsaturated aldehydes, ketones and ethers, e.g., acrolein and vinylethyl ether. Also included are the various synthetic rubbers prepared from the homopolymerization of isoprene and the copolymerization of isoprene with other diolefins and various unsaturated organic compounds. Also, included are the synthetic rubbers such as 1,4-cis polybutadiene and 1,4-cis polyisoprene and similar synthetic rubbers which have been developed in recent years, such as EPDM. Such recently developed rubbers include those that have polymer bound functionality such as antioxidants and antiozonants. These polymer bound materials are known in the art and can have functionalities that provide antidegradative properties, synergism, and other properties. Polymer bound functions have great value since the pendant functionality that possesses the desired activity cannot be extracted or migrate since it is chemically attached to the backbone of the polymer. The preferred rubbers used with the instant invention are natural rubber, styrene/butadiene copolymers, polybutadiene, EPDM and polyisoprene.

The TOFA mixtures may be used with any conventional compounding additives such as carbon black, synthetic silica, zinc oxide, sulfur, processing aids and antidegradants. For the purposes of this invention, "sulfur vulcanizing agent" means an elemental sulfur or sulfur donating vulcanizing agents, for example, a sulfur olefin adduct, an amine disulfide or a polymeric polysulfide. Preferably, the tall oil fatty acid mixture is used with free sulfur.

The vulcanizable composition of the present invention may be used with any conventional accelerators. Examples of accelerators which may be used in the present invention include amines, guanidines, thioureas, thiazoles, thiurams, sulfenamides, dithiocarbamates and xanthates.

The following examples illustrate the use of various tall oil fatty acids in the present invention. These examples are presented for the purposes of demonstrating but not limiting the scope of the present invention.

The following examples were conducted in order to evaluate the performance of tall oil fatty acid mixtures as a replacement for oleic acid or stearic acid in rubber compounds. Several tall oil fatty acid mixtures were evaluated by compounding them into productive masterbatches. The tall oil fatty acid mixtures that were evaluated are listed in Table I along side the weight percentage of the major component acids as determined by GC.

TABLE I

| Sample | Description | % Oleic | % Linoleic | % Conjugated Linoleic | % Rosin | % Stearic | Other* |
|---|---|---|---|---|---|---|---|
| 1 | Control | 73.0 | 7.0 | 0 | 0 | 1.0 | 8.0 |
| 2 | Acintol FA2 | 46.5 | 38.8 | 10.0 | .3 | 2.0 | 4.4 |
| 3 | Westvaco L1A Special | 45.4 | 32.0 | 18.0 | .5 | 2.0 | 0.8 |
| 4 | Westvaco L1 | 43.0 | 34.0 | 11.0 | 1.4 | 3.0 | 7.3 |
| 5 | Westvaco L-5A Special | 41.0 | 33.0 | 15.0 | 3.0 | 2.0 | 3.0 |
| 6 | Acintol FA1 | 41.0 | 32.3 | 10.0 | 3.6 | 2.0 | 11.1 |
| 7 | Westvaco L-5 | 39.0 | 27.0 | 6.0 | 4.7 | 2.0 | 21.3 |
| 8 | Westvaco 1480 | 30.0 | 34.0 | 20.0 | 0 | 0 | 16.0 |
| 9 | Acintol D30LR | 18.5 | 14.5 | 18.0 | 14.2 | 1.0 | 34.0 |
| 10 | Acintol D40LR | 6.4 | 5.8 | 25.3 | 19.9 | .5 | 40.1 |

Samples 2, 6, 9 and 10 were obtained from Arizona Chemical Company.
Samples 3, 4, 5, 7 and 8 were obtained from Westvaco.

EXAMPLE 1

The nonproductive masterbatch used in Example 1 had the composition listed in Table II.

TABLE II

| Component | Amount (phr) |
|---|---|
| Natural Rubber | 100 |
| Carbon Black | 57 |
| Tackifier | 2 |
| Sample 1 or TOFA | 2 |

The nonproductive masterbatch of Table II was mixed on a Banbury for 3 minutes and then compounded with the productive ingredients in Table III.

TABLE III

| Component | Amount (phr) |
|---|---|
| Resorcinol based resin | 3.0 |
| Silica | 10.0 |
| Accelerator | .75 |
| Zinc oxide | 8.0 |
| Sulfur | 5.0 |
| Antioxidant | .75 |

The compounds were mixed for about 2 minutes, sheeted and samples of each compound were measured for their physical properties. In all of the following examples, each physical property was measured in the same manner. The maximum torque, minimum torque and delta torque were measured according to ASTM No. D-2084. The T1, Tc25 and Tc90 were measured on a Monsanto Model MPV rheometer. The modulus values were measured according to ASTM No. D-412. The Zwick rebound was measured according to the principles of ASTM No. D-1054.

Strebler adhesion testing was done to determine the interfacial adhesion between various rubber formulations that were prepared. The interfacial adhesion was determined by pulling one compound from another at a right angle to the untorn test specimen with the two right ends being pulled apart at a 180° angle to each other using an Instron machine. The area of contact was determined from placement of a Mylar sheet between the compounds during cure. A window in the Mylar allowed the two materials to come into contact with each other during testing.

Table IV below sets out the particular sample number from Table I that was used and the resulting physical properties of each compound.

TABLE IV

| Sample No. | Control 1 | 2 | 3 | 6 | 8 | 9 | 10 |
|---|---|---|---|---|---|---|---|
| Rheometer @ 150° C. | | | | | | | |
| Maximum torque | 65 | 66 | 62 | 60.5 | 73 | 67 | 61 |
| Minimum torque | 10 | 9 | 9 | 9 | 9 | 10 | 10 |
| T1 | 4 | 5 | 5 | 5 | 5 | 4.5 | 5 |
| Tc25 | 8 | 8.5 | 8.5 | 8.5 | 8.5 | 8 | 9 |
| Tc90 | 20 | 20.5 | 20 | 20.5 | 20 | 20.5 | 21.5 |
| Strebler Adhesion (Newton) | | | | | | | |
| Self | 52.5 | 39 | 102 | 104 | 26 | 35 | 94 |
| A655 | 40 | 32 | 48 | 39 | 41 | 42 | 45 |
| Modulus | | | | | | | |
| Tensile MPa | 22 | 23 | 22 | 23.5 | 22.2 | 23.4 | 23 |
| % Elongation | 430 | 498 | 470 | 495 | 406 | 426 | 490 |
| M300 MPa | 16 | 16.4 | 14.8 | 15 | 17 | 17.6 | 15 |

EXAMPLE 2

Sample 1 or a TOFA mixture listed in Table I was mixed into a nonproductive masterbatch according to the recipe listed below in Table V.

TABLE V

| Component | Amount (phr) |
|---|---|
| Natural rubber | 55 |
| Polyisoprene | 45 |
| Carbon Black | 60 |
| Tackifier | 5 |
| Sample 1 or TOFA | 2 |

The nonproductive masterbatch of Table V was mixed on a Banbury for 3 minutes and then compounded with the productive ingredients in Table VI.

TABLE VI

| Component | Amount (phr) |
|---|---|
| Zinc Oxide | 8.0 |
| Resorcinol based resin | 4.8 |
| Sulfur | 2.4 |
| Accelerator | 1.2 |

TABLE VI-continued

| Component | Amount (phr) |
|---|---|
| Antioxidant | .75 |

The compounds were mixed for about 2 minutes and sheeted. Test samples were evaluated for their physical properties which are listed in Table VII below.

TABLE VII

| Sample No. | Control 1 | 2 | 4 | 5 | 7 | 8 | 10 |
|---|---|---|---|---|---|---|---|
| Rheometer @ 150° C. | | | | | | | |
| Maximum torque | 63.1 | 62.1 | 62.6 | 65.2 | 64.5 | 61.9 | 65.6 |
| Minimum torque | 12 | 11.7 | 11.2 | 12 | 13.3 | 11.6 | 13.6 |
| Delta torque | 51.1 | 50.4 | 51.4 | 53.2 | 51.2 | 50.3 | 52.0 |
| T1 | 3 | 3 | 2.6 | 2.8 | 2.9 | 3.6 | 3.6 |
| Tc25 | 7.4 | 7.2 | 7.2 | 7.6 | 7.1 | 7.6 | 8.1 |
| Tc90 | 21.6 | 23.8 | 20.9 | 23.7 | 21.4 | 21.8 | 32.9 |
| Strebler Adhesion (Newton) | | | | | | | |
| Self | 43.5 | 55 | 50 | 42.5 | 53 | 45 | N/A |

EXAMPLE 3

Sample 1 or a TOFA mixture listed in Table I was mixed into a nonproductive masterbatch according to the recipe listed below in Table VIII.

TABLE VIII

| Component | Amount (phr) |
|---|---|
| Natural rubber | 90.00 |
| Polybutadiene | 10.00 |
| Carbon black | 90.00 |
| Oil | 6.25 |
| Tackifier | 3.00 |
| Sample 1 or TOFA | 1.00 |

The nonproductive masterbatch of Table VIII was mixed on a Banbury for 3 minutes and then compounded with the productive ingredients in Table IX.

TABLE IX

| Component | Amount (phr) |
|---|---|
| Resorcinol based resin | 9.56 |
| Sulfur | 4.00 |
| Accelerator | 1.60 |
| Zinc oxide | 5.00 |

The compounds were mixed for about 2 minutes and sheeted. Test samples were evaluated for their physical properties which are listed in Table X below.

TABLE X

| Sample No. | Control 1 | 2 | 4 | 5 | 7 | 8 | 10 |
|---|---|---|---|---|---|---|---|
| Rheometer @ 150° C. | | | | | | | |
| Maximum torque | 92 | 99 | 104 | 100 | 86 | 100 | 100 |
| Minimum torque | 16 | 15 | 4 | 4 | 4 | 10 | 4 |
| Delta torque | 76 | 84 | 100 | 96 | 82 | 90 | 96 |
| T1 | 2.5 | 3 | 4.5 | 5 | 4.5 | 3 | 5 |
| Tc25 | 5.5 | 5.5 | 6 | 6.5 | 4.5 | 6 | 6 |
| Tc90 | 26 | 22 | 22 | 20.5 | 21.5 | 21.5 | 22.5 |
| Strebler Adhesion (Newton) | | | | | | | |
| Self | 32 | 32 | 64 | 64 | 55 | 60 | 62 |
| Modulus | | | | | | | |
| Tensile MPa | 17.2 | 17.4 | 17.4 | 17.5 | 17.2 | 16.7 | 17.5 |
| % Elongation | 250 | 270 | 220 | 240 | 230 | 225 | 215 |
| M300 MPa | 13.6 | 13.4 | 15 | 15 | 15.4 | 15.1 | 16 |

EXAMPLE 4

Stearic acid or a TOFA mixture listed in Table I was mixed into a nonproductive masterbatch according to the recipe listed in Table XI.

TABLE XI

| Component | Amount (phr) |
|---|---|
| Oil extended polybutadiene | 28.10 |
| Oil extended SBR | 96.25 |
| Stearic acid or TOFA | 2.00 |
| Wax | .80 |
| Oil | 12.00 |
| Carbon black | 68.00 |

The nonproductive masterbatch of Table XI was mixed on a Banbury for 3 minutes and then compounded with the productive ingredients in Table XII.

TABLE XII

| Component | Amount (phr) |
|---|---|
| Zinc oxide | 2.00 |
| Sulfur | 1.45 |
| Accelerator | 1.10 |

The compounds were mixed for about 2 minutes, sheeted and samples of each compound were tested for their physical properties. Table XIII below sets out the resulting properties of each compound.

TABLE XIII

| Sample | Control Stearic Acid | 4 | 5 | 7 |
|---|---|---|---|---|
| Rheometer @ 150° C. | | | | |
| Maximum torque | 29.1 | 28.4 | 28.8 | 29.1 |
| Minimum torque | 6.4 | 6.5 | 6.7 | 6.7 |
| Delta torque | 22.7 | 21.9 | 22.1 | 22.4 |
| Tc25 | 7.8 | 8.2 | 7.9 | 8.2 |
| Tc90 | 17 | 18.4 | 17.4 | 18.2 |
| Strebler Adhesion @ 95° C. (Newton) | | | | |
| Self | 111 | 116 | 120 | 130 |
| Zwick Rebound @ 60° C. | 62 | 60.5 | 60 | 58 |
| Zwick Rebound @ 0° C. | 29 | 27.5 | 28 | 27.5 |

EXAMPLE 5

Stearic acid or TOFA sample number 5 was mixed into a nonproductive masterbatch according to the recipe listed in XIV.

TABLE XIV

| Component | Amount (phr) |
|---|---|
| Natural rubber | 40.00 |
| Polybutadiene | 60.00 |
| Tackifier | 10.00 |
| Oil | 5.00 |
| Carbon black | 50.00 |
| Wax | 1.00 |
| Stearic acid or TOFA Sample No. 5 | 1.00 |
| Antioxidant | 1.00 |

The nonproductive masterbatch of Table XIV was mixed on a Banbury for 3 minutes and then compounded with the productive ingredients in Table XV.

TABLE XV

| Component | Amount (phr) |
|---|---|
| Accelerator | .50 |
| Zinc oxide | 3.50 |
| Antiozonants | 3.00 |
| Sulfur | 2.25 |

The compounds were mixed for about 2 minutes, sheeted and samples of each compound were tested for their physical properties of each compound.

TABLE XVI

| Sample | Control Stearic Acid | No. 5 |
|---|---|---|
| Rheometer 150° C. | | |
| Maxium torque | 60 | 53 |
| Minimum torque | 7.6 | 7.7 |
| T1 | 5.2 | 5.2 |
| Tc25 | 8.2 | 8.1 |
| Tc90 | 25 | 23 |
| Modulus | | |
| Tensile (MPa) | 14.7 | 15.2 |

TABLE XVI-continued

| Sample | Control Stearic Acid | No. 5 |
|---|---|---|
| % Elongation | 680 | 690 |
| M300 (MPa) | 5.3 | 5.1 |
| Strebler Adhesion @ 120° C. (Newton) | 55 | 60 |

EXAMPLE 6

Stearic acid or TOFA sample number 5 was mixed into a nonproductive masterbatch according to the recipe listed in XVII.

TABLE XVII

| Component | Amount (phr) |
|---|---|
| Natural rubber | 100.00 |
| Carbon black | 57.00 |
| Silica | 10.00 |
| Stearic acid or TOFA No. 5 | 2.00 |
| Tackifier | 3.00 |
| Cobalt salt | 1.00 |
| Antioxidant | 1.00 |

The nonproductive masterbatch of Table XVII was mixed on a Banbury for 3 minutes and then compounded with the productive ingredients in Table XVIII.

TABLE XVIII

| Component | Amount (phr) |
|---|---|
| Zinc oxide | 5.00 |
| Sulfur | 5.00 |
| Accelerator | .75 |
| Antioxidant | .75 |

The compounds were mixed for about 2 minutes, sheeted and samples of each compound were tested for their physical properties. Table XIX below sets out the resulting properties of each compound.

TABLE XIX

| Sample | Control Stearic Acid | No. 5 |
|---|---|---|
| Rheometer 150° C. | | |
| Maxium torque | 64 | 72 |
| Minimum torque | 12 | 8 |
| Delta torque | 52 | 64 |
| Tc25 | 18 | 18 |
| Tc90 | 110 | 105 |
| Modulus | | |
| Tensile (MPa) | 22 | 21.8 |
| % Elongation | 530 | 480 |
| M300 (MPa) | 13 | 13 |
| Strebler Adhesion @ 120° C. (Newton) | | |
| Self | 91 | 70 |
| TA 427 | 35 | 70 |
| TA 690 | 60 | 73 |

EXAMPLE 7

The nonproductive masterbatch had the following composition listed in Table XX.

TABLE XX

| Component | Amount (phr) |
|---|---|
| Natural rubber | 50.00 |
| Oil extended medium vinyl polybutadiene | 34.40 |
| Polybutadiene | 25.00 |
| Carbon black | 60.00 |
| Oil | 15.00 |

TABLE XX-continued

| Component | Amount (phr) |
|---|---|
| Stearic acid or TOFA No. 5 | 2.50 |
| Wax | .75 |
| Antiozonant | 2.00 |

The nonproductive masterbatch of Table XX was mixed on a Banbury for 3 minutes and then compounded with the productive ingredients in Table XXI.

TABLE XXI

| Component | Amount (phr) |
|---|---|
| Zinc oxide | 3.00 |
| Resorcinol based resin | 2.25 |
| Sulfur | 1.00 |
| Accelerator | .80 |
| Antioxidant | 1.00 |

The compounds were mixed for about 2 minutes, sheeted and samples of each compound were tested for their physical properties. Table XXII below sets out the resulting properties of each compound.

TABLE XXII

| Sample | Control Stearic Acid | No. 5 |
|---|---|---|
| Rheometer @ 135° C. | | |
| Maximum torque | 41 | 40 |
| Minimum torque | 12 | 13 |
| T2 | 6 | 7 |
| Tc25 | 21 | 20 |
| Tc90 | 37 | 37 |
| Strebler Adhesion @ 95° C. | | |
| | 93 | 87 |
| Self (N) | 60 | 80 |
| Modulus | | |
| Tensile (MPa) | 20.2 | 19.5 |
| % Elongation | 525 | 540 |
| M300 (MPa) | 9.8 | 9.1 |

EXAMPLE 8

A nonproductive masterbatch had the following composition listed in XXIII.

TABLE XXIII

| Component | Amount (phr) |
|---|---|
| Natural rubber | 50.00 |
| SBR | 50.00 |
| Carbon black | 40.00 |
| Silica | 15.00 |
| Oil | 3.50 |
| Antiozonant | 2.00 |
| Stearic acid or TOFA No. 5 | 2.00 |

The nonproductive masterbatch of Table XXIII was mixed on a Banbury for 3 minutes and then compounded with the productive ingredients in Table XXIV.

TABLE XXIV

| Component | Amount (phr) |
|---|---|
| Zinc oxide | 3.5 |
| Accelerator | 1.9 |
| Antioxidant | .75 |

The compounds were mixed for about 2 minutes, sheeted and samples of each compound were tested for their physical properties. Table XXV below sets out the resulting properties of each compound.

TABLE XXV

| Sample | Control Stearic Acid | TOFA No. 5 |
|---|---|---|
| Rheometer @ 150° C. | | |
| Maximum torque (MPa) | 40 | 40 |
| Minimum torque (MPa) | 8 | 8 |
| T2 | 5.5 | 6.25 |
| Tc25 | 6 | 7 |
| Tc90 | 12 | 13.5 |
| Modulus | | |
| Tensile (MPa) | 16.8 | 17.1 |
| % Elongation | 544 | 577 |
| M300 (MPa) | 8.25 | 7.5 |
| Strebler Adhesion (Newton) | | |
| @ 95° C. | 27 | 36 |
| @ 120° C. | 17.15 | 24.7 |

As can be seen from the data in Tables IV, VII, X, XIII, XVI, IXX, XXII, and XXV, use of a TOFA was found to perform as well if not superior to the controls while concomitantly improving adhesion characteristics in the rubber compounds.

What is claimed is:

1. A method of enhancing the cure of a sulfur vulcanizable elastomer selected from the group consisting of natural rubber, synthetic rubber or mixture thereof which comprises adding to a sulfur vulcanizable elastomer a mixture of tall oil fatty acids wherein said tall oil fatty acid mixture comprises at least (a) from about 28% to about 55% by weight of oleic acid, (b) from about 25% to about 40% by weight of linoleic acid, (c) from about 4% to about 20% conjugated linoleic acid and (d) from about 0% to about 8% rosin acids.

2. The method of claim 1 wherein from about 0.1 to about 6.0 phr of a mixture of tall oil fatty acids is added to said elastomer.

3. The method of claim 2 wherein from about 0.5 to about 3.5 phr of a mixture of tall oil fatty acids is added to said elastomer.

4. The method of claim 1 wherein the mixture of tall oil fatty acids additionally contains from about 1% to about 4% stearic acid.

5. The method of claim 1 wherein the mixture of tall oil fatty acids additionally contains from about 1% to about 15% by weight of at least one acid selected from the group consisting of palmitic acid, palmitoleic acid, margaric acid, octadecadienoic acid and octadecatrienoic acid.

6. The method of claim 1 wherein said elastomer is synthetic and is selected from the group consisting of polymerization products of butadiene and isoprene.

7. The method of claim 1 wherein said elastomer is synthetic and is selected from the group consisting polybutadiene, polyisoprene, styrene/butadiene copolymers, terpolymers of acrylonitrile butadiene and styrene and blends thereof.

* * * * *